(12) United States Patent
Dudar (10) Patent No.: US 12,454,210 B2
(45) Date of Patent: Oct. 28, 2025

(54) SYSTEMS AND METHODS TO HEAT A FLUID CONTAINED IN A TANK ATTACHED TO A VEHICLE

(71) Applicant: Ford Global Technologies, LLC, Dearborn, MI (US)

(72) Inventor: Aed M. Dudar, Canton, MI (US)

( * ) Notice: Subject to any disclaimer, the term of this patent is extended or adjusted under 35 U.S.C. 154(b) by 548 days.

(21) Appl. No.: 18/060,512

(22) Filed: Nov. 30, 2022

(65) Prior Publication Data

US 2024/0174161 A1    May 30, 2024

(51) Int. Cl.
   *B60P 3/22*   (2006.01)
(52) U.S. Cl.
   CPC ................................. *B60P 3/2295* (2013.01)
(58) Field of Classification Search
   CPC .............................. B60P 3/2295; F24H 15/219
   See application file for complete search history.

(56) References Cited

U.S. PATENT DOCUMENTS

| 2015/0035484 | A1 | 2/2015 | Mashinsky | |
| 2017/0113703 | A1* | 4/2017 | Hoffman | H05B 6/108 |

FOREIGN PATENT DOCUMENTS

| CN | 113306415 A | 8/2021 |
| KR | 101057084 B1 | 8/2011 |

OTHER PUBLICATIONS

Beauhd, First US Mile of Wireless EV Charging road Coming to Detroit, Slashdot Feb. 2, 2022.

* cited by examiner

*Primary Examiner* — Carl C Staubach
*Assistant Examiner* — Charles J Brauch
(74) *Attorney, Agent, or Firm* — Emily Drake; Eversheds Sutherland (US) LLP (57) ABSTRACT

The disclosure generally pertains to systems and methods for heating a fluid being transported in a vehicle. An example method includes identifying, by a processor, a target fluid temperature and determining, based on the target fluid temperature, a separation distance between a tank attached to an underbody of the vehicle and an inductive heating element embedded in a road. The processor lowers the tank to a heating position above the inductive heating element based on the separation distance, and retains the tank in the heating position for using the inductive heating element to heat a fluid contained in the tank. The processor may raise the tank to a retracted position upon determining that the fluid has been heated to the target fluid temperature. The processor re-lowers the tank to the heating position upon detecting a drop in temperature of the fluid when the tank is in the retracted position.

20 Claims, 6 Drawing Sheets

SYSTEMS AND METHODS TO HEAT A FLUID CONTAINED IN A TANK ATTACHED TO A VEHICLE

BACKGROUND

It is often desirable to heat a fluid, such as, for example, water or coffee, when traveling in a vehicle. One way to do so is to use an electrical socket in the vehicle to provide power to a heating element of a mug in which the coffee is contained. However, it may be inconvenient or undesirable to do so in at least some situations, such as, for example, when the electrical socket is in use for another more important purpose. Another way to do so is to stop the vehicle at a convenient spot (a rest stop, a gas station, or a restaurant, for example) and use a microwave oven to heat the water or coffee. However, this approach may also be undesirable for some reasons such as, for example, to avoid a travel delay as a result of the stop.

In another scenario, it may be desirable to heat a fluid that is being transported in a vehicle such as, for example, oil, particularly when the vehicle is traveling in cold weather conditions. In this scenario, it may be impractical, inconvenient, and/or undesirable to use electrical power generated by the vehicle to heat the fluid.

In view of the example scenarios described above, it is desirable to provide alternative solutions for heating a fluid that is being transported in a vehicle.

DESCRIPTION OF THE FIGURES

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The disclosure generally pertains to systems and methods for heating a fluid being transported in a vehicle. An example method can include identifying, by a processor in a vehicle, a target fluid temperature and determining, based on the target fluid temperature, a separation distance between a tank that is attached to an underbody of the vehicle and an inductive heating element embedded in a road. The processor then lowers the tank to a heating position above the inductive heating element based on the separation distance, and retains the tank in the heating position for using the inductive heating element to heat a fluid contained in the tank. The processor may raise the tank to a retracted position upon determining that the fluid has been heated to the target fluid temperature. Furthermore, upon detecting a drop in temperature of the fluid below the target fluid temperature when the tank is in the retracted position, the processor may lower the tank again to the heating position for re-heating the fluid to the target fluid temperature.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionalities described with respect to a particular device or component may be performed by another device or component. For example, some or all of the functionalities described herein with respect to a personal device may, in certain embodiments, be performed by a vehicle controller and/or another component of a vehicle. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, the word "vehicle" as used in this disclosure can pertain to any one of various types of vehicles, such as, for example, cars, vans, sports utility vehicles, all-terrain vehicles, trucks, electric vehicles, gasoline vehicles, hybrid vehicles, and autonomous vehicles. The word "fluid" as used herein includes liquids as well as other substances having liquid content (any percentage).

The phrase "personal device" as used herein refers to any of various types of devices that can be carried around by an individual. A few examples of personal devices, which can also be referred to as mobile devices, can include: a cellular phone, a smartphone, a tablet computer, a phablet (phone plus tablet computer), and a portable computer. Such personal devices may be used for performing various operations, including for communicating with a fluid tank heating system in accordance with the disclosure. A personal device may communicate with components of a vehicle, such as, for example a vehicle controller and/or a fluid tank heating system, using various communication media and communication formats. For example, a smartphone may communicate with a vehicle controller and/or a fluid tank heating system via a cellular communication link and cellular communications infrastructure (cell towers, repeaters, etc.). As another example, a phablet or a laptop computer may communicate with a vehicle controller and/or a fluid tank heating system via a Bluetooth® communication link.

The word "underbody" as used herein refers to any portion of an underside of a chassis of a vehicle and further applies to any portion on an underside of a chassis of an object that is detachably attached to the vehicle (such as, for example, a trailer) or fixedly attached to the vehicle (such as, for example, a tailgate), or mounted to a fixture coupled to the vehicle.

It must be understood that words such as "implementation," "application," "scenario," "case," and "situation" as used herein represent abbreviated versions of the phrase "In an example ("implementation," "application," "scenario," "case," "approach," and "situation") in accordance with the disclosure." It must also be understood that the word "example" as used herein is intended to be non-exclusionary and non-limiting in nature.

Figure 1:
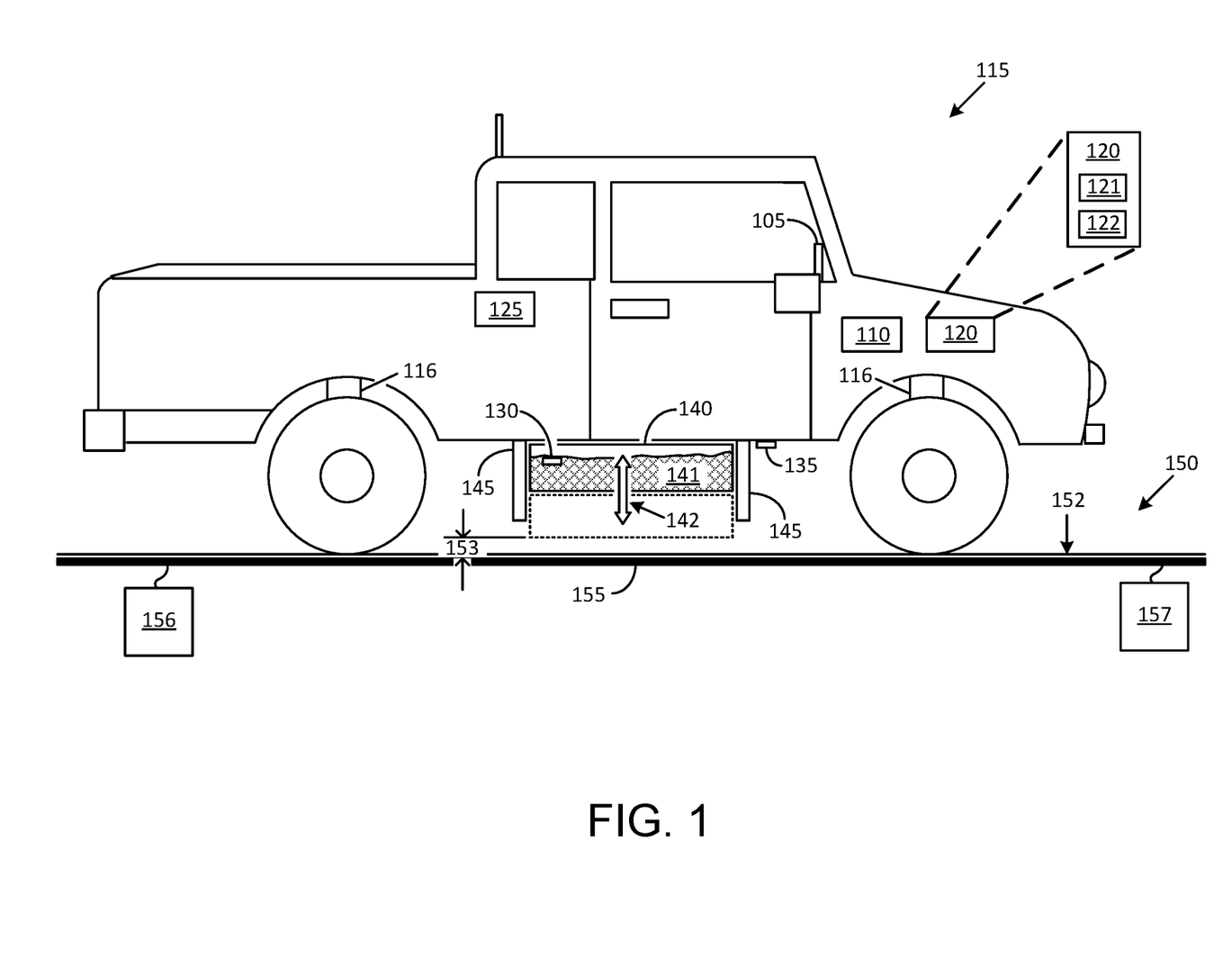
FIG. 1 illustrates an example vehicle configured for heating a fluid in accordance with a first embodiment of the disclosure.

FIG. 1 illustrates an example vehicle 115 configured for heating a fluid 141 in accordance with a first embodiment of the disclosure. The fluid 141 is contained in a tank 140 that is attached to an underbody of the vehicle 115. In other embodiments, the tank 140 can be attached to any of various other parts of the vehicle 115 in a manner that allows the tank 140 to be manipulated for heating the fluid by use of an embedded inductive heating system in ways as described herein.

The vehicle 115 is illustrated in the form of a truck, but it must be understood that the description provided herein is equally applicable to many other vehicles such as, for example, a recreational vehicle (RV), a sedan, a van, a sports utility vehicle (SUV), a utility terrain vehicle (UTV), an all-terrain vehicle (ATV), or a bus.

The vehicle 115 may have various types of automotive drive systems in various applications. Example drive systems can include various types of internal combustion engine (ICE) powertrains having a gasoline, diesel, or natural gas-powered combustion engine with conventional drive components such as, a transmission, a drive shaft, a differential, etc.

In some cases, the vehicle 115 may be configured as an electric vehicle (EV). More particularly, the vehicle 115 may include a battery EV (BEV) drive system. The vehicle 115 may be configured as a hybrid EV (HEV) having an independent onboard power plant or a plug-in HEV (PHEV) that includes a HEV powertrain connectable to an external power source (including a parallel or series hybrid powertrain having a combustion engine power plant and one or more EV drive systems). HEVs can include battery and/or super capacitor banks for power storage, flywheel power storage systems, or other power generation and storage infrastructure.

The vehicle 115 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components. Further, in some cases, the vehicle 115 may be a driver-operated vehicle that can be operated in a fully autonomous or partially autonomous mode. More particularly, in an example embodiment in accordance with disclosure, the vehicle 115 is an autonomous vehicle that can perform various operations described herein in an autonomous (or semi-autonomous) mode of operation with or without a person being present in the vehicle 115.

The vehicle 115 can include various components such as, for example, a vehicle controller 110, a fluid tank heating system 120, an infotainment system 105, a communications system 125, and the tank 140 along with associated hardware.

The vehicle controller 110 may be installed in an engine compartment of the vehicle 115 (as schematically illustrated in FIG. 1) or elsewhere in the vehicle 115. The vehicle controller 110 is arranged to cooperate with various components of the vehicle 115 such as, for example, a fuel injection system and a speed control system, to control various operations of the vehicle 115. Some example functions may include controlling engine operations (fuel injection, speed control, emissions control, braking, etc.), managing climate controls (air conditioning, heating etc.), activating airbags, and issuing alerts (check engine light, bulb failure, low tire pressure, vehicle in blind spot, etc.).

The infotainment system 105 can include a navigation system incorporating global positioning system (GPS) circuitry and a display screen that may be used for various purposes including for purposes of displaying a graphical user interface (GUI) that is useable by an occupant of the vehicle 115. The GUI may also be used by a driver of the vehicle 115 to provide and/or to obtain temperature related information to/from the fluid tank heating system 120.

The communications system 125 can include various components such as, for example, a wireless transmitter, a wireless receiver, and/or a wireless transceiver, that are configured to allow the fluid tank heating system 120 and the vehicle controller 110 to communicate with devices such as, for example, a personal device carried by a driver of the vehicle 115 and a server computer (not shown) located outside the vehicle 115. The communications may be carried out via wireless signals either directly or via a network by use of any of various communication formats such as, for example, WiFi, cellular, TCP/IP, Bluetooth®, Ultra-Wideband, Wi-Fi, Ultra-Wideband (UBW), Zigbee®, and near-field-communications (NFC). The network may include any one, or a combination of networks, such as a local area network (LAN), a wide area network (WAN), a telephone network, a cellular network, a cable network, a wireless network, and/or private/public networks such as the Internet.

The fluid tank heating system 120 can include a processor 121 and a memory 122. The memory 122 may be a non-transitory computer-readable memory that stores computer-executable instructions. The computer-executable instructions can be provided in the form of a software application that is executed by the processor 121 to perform various operations in accordance with the disclosure that are associated with heating the fluid 141 contained in the tank 140.

In the illustrated example embodiment, the tank 140 is attached to an underbody of the vehicle 115 by means of an elevator apparatus 145. In other embodiments, the tank 140 can be attached to any portion of the vehicle 115 that would allow the tank 140 to be lowered towards the ground. The tank 140 can contain any material that rises in temperature when subjected to a magnetic field produced by an inductive heating element. Examples of objects that contain such materials include cookware utensils that can be heated by placement upon an inductive cooktop.

In an example implementation, the tank 140 can be a metal container where the metal includes ferrous and/or ferric content. In another example implementation, the tank 140 is a non-metallic container that is coated or painted with a material that having ferrous and/or ferric content. In an example case, the non-metallic container can be made of a composite material coated with a paint having a ferrous and/or ferric content.

The tank 140 can have any of various shapes. It is generally desirable that the tank 140 have a shape that includes a flat bottom portion offering maximal magnetic coupling to an inductive heating element embedded in a ground surface. The shape of the tank 140 may also be defined on the basis of a content of the tank 140. In general, and in accordance with the disclosure, the selection of the type of content of the tank 140 may be governed by a desirability to heat the content when being transported in the vehicle 115.

In an example embodiment, the tank 140 is configured to store a fluid 141. The fluid can be any of various liquids such as, for example, water, oil, or a chemical. The water may be used for example, by a driver or occupant of the vehicle 115 for any of various domestic purposes such as, for example, when camping. A few examples of domestic purposes of the water can include drinking, bathing, and washing. In another example embodiment, the tank 140 is configured to store a substance having liquid content such as, for example, creosote, asphalt, or tar. It is desirable to transport such materials in a heated condition so as to prevent hardening or solidification.

In an example implementation, a temperature sensor 130 is located either inside the tank 140 or upon a body portion of the tank 140. The temperature sensor 130 is configured to provide to the processor 121 of the fluid tank heating system 120, temperature information of the fluid 141 contained in the tank. Another temperature sensor 135 may be provided on the vehicle 115 and configured to provide to the processor 121 of the fluid tank heating system 120, ambient temperature information outside the tank 140. The temperature information provided by the temperature sensor 130 and the temperature sensor 135 may be used by the processor 121 to perform various operations such as, for example, to identify a target fluid temperature that is desired when heating the fluid 141, measuring a temperature of the fluid 141 to determine whether the target fluid temperature has been reached, maintained, or changed.

The elevator apparatus 145 coupled to the tank 140 can include components that are controllable by the processor 121 of the fluid tank heating system 120. In an example implementation, the elevator apparatus 145 can include components such as one or more motors, linear actuators, pulleys, chains, ratchets, guide rails, and tracks that allow the processor 121 to move the tank 140 bidirectionally. The bi-directional movement feature of the tank 140 is indicated by an arrow 142.

The vehicle 115 can also include a suspension system 116 that can be activated by a processor (such as, for example, a processor in the vehicle controller 110) for raising or lowering a chassis of the vehicle 115 when so desired by a driver of the vehicle 115. Raising the chassis is generally carried out when the vehicle 115 is driven off-road so as to provide a greater amount of clearance between the underbody of the vehicle 115 and a ground surface. Lowering the chassis may be carried out, for example, to reduce wind resistance of the vehicle 115.

In an example scenario, the processor 121 of the fluid tank heating system 120 is either aware of, or made aware of (by a processor of the vehicle controller 110), a status of the suspension system 116 (activated or inactivated status) and can operate the elevator apparatus 145 based on the status. This aspect is described below in more detail.

The vehicle 115 is illustrated in FIG. 1 as located on a road surface of a road 150. An inductive heating system is incorporated into the road 150. In an example implementation, the inductive heating system includes induction heating controllers that are spaced at intervals along the road 150 such as, for example, an example induction heating controller 156 and an example induction heating controller 157. An inductive heating element 155 is embedded in the road 150. Typically, an upper surface of the inductive heating element 155 is either exposed to air above the road surface 152 or is embedded below the road surface 152.

The tank 140 that is attached to the underbody of the vehicle 115 can be raised and placed in a retracted position by the fluid tank heating system 120 when the inductive heating effect provided by the inductive heating element 155 is not desired. When heating is desired, the fluid tank heating system 120 lowers the tank 140 towards the road surface 152. The fluid tank heating system 120 may also identify and select a separation distance 153 between a bottom surface of the tank 140 and the road surface 152 for heating the fluid 141 contained in the tank 140 to a desired temperature. The tank 140 may be lowered either when the vehicle 115 is in motion or when the vehicle 115 is stationary.

Figure 2:
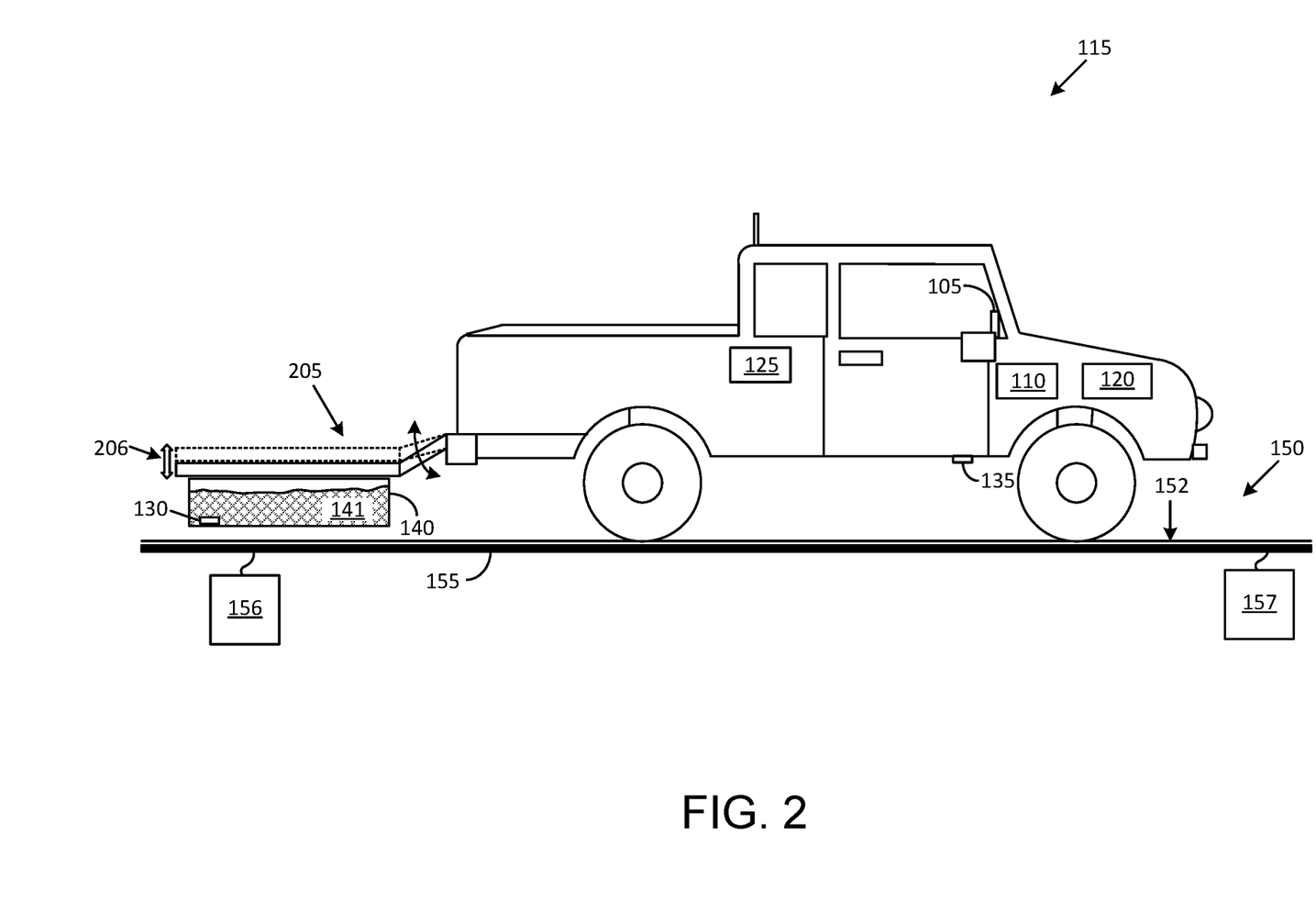
FIG. 2 illustrates an example vehicle configured for heating a fluid in accordance with a second embodiment of the disclosure.

FIG. 2 illustrates the example vehicle 115 configured for heating a fluid 141 in accordance with a second embodiment of the disclosure. In this embodiment, the tank 140 is mounted upon a liftgate 205 that can be a fixed or a removable part of the vehicle 115. More particularly, in this embodiment, the tank 140 is attached to a bottom surface of a portion of the liftgate 205. The bottom surface of a portion of the liftgate 205 is configured to be substantially parallel to the road surface 152 when the liftgate 205 is deployed. In another embodiment, the tank 140 is placed upon a top surface of the liftgate 205. In this embodiment, the liftgate 205 is made of a material that does not interfere with the inductive heating action provided by the inductive heating element 155 to the tank 140.

In an example operation in accordance with the disclosure, lowering and raising of the liftgate 205 is carried out under control of the fluid tank heating system 120. In another example operation in accordance with the disclosure, an individual may opt to lower and/or lift the gate manually, such as, for example, when the vehicle 115 is parked 150 for a liftgate party. The individual may obtain temperature information of the fluid 141 via the temperature sensor 130 in order to determine an amount of heating to be performed. In this scenario, the temperature sensor 130 may be configured to wirelessly communicate with a personal device (not shown) of the individual for displaying the temperature information on the personal device or may be configured to display the temperature information on the infotainment system 105.

Figure 3:
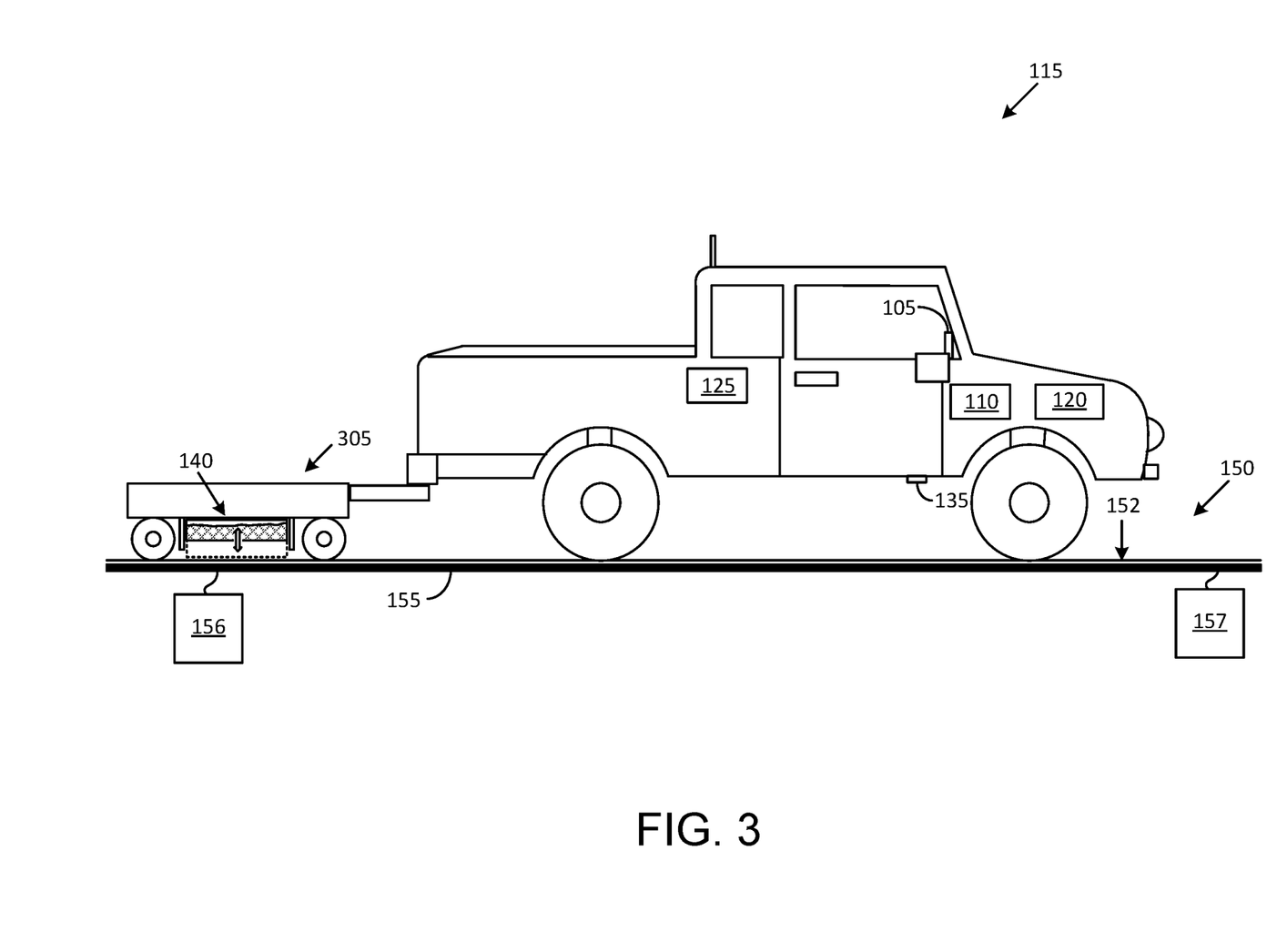
FIG. 3 illustrates an example vehicle configured for heating a fluid in accordance with a third embodiment of the disclosure.

FIG. 3 illustrates the example vehicle 115 configured for heating a fluid 141 in accordance with a third embodiment of the disclosure. In this embodiment, the tank 140 is mounted upon a trailer 305 that is attached fixedly or removably to the vehicle 115. More particularly, in this embodiment, the tank 140 is attached to an underbody of the trailer 305. In an example operation in accordance with the disclosure, lowering and raising of the tank 140 is carried out under control of the fluid tank heating system 120 either when the vehicle 115 is in motion or when the vehicle 115 is parked.

Figure 4:
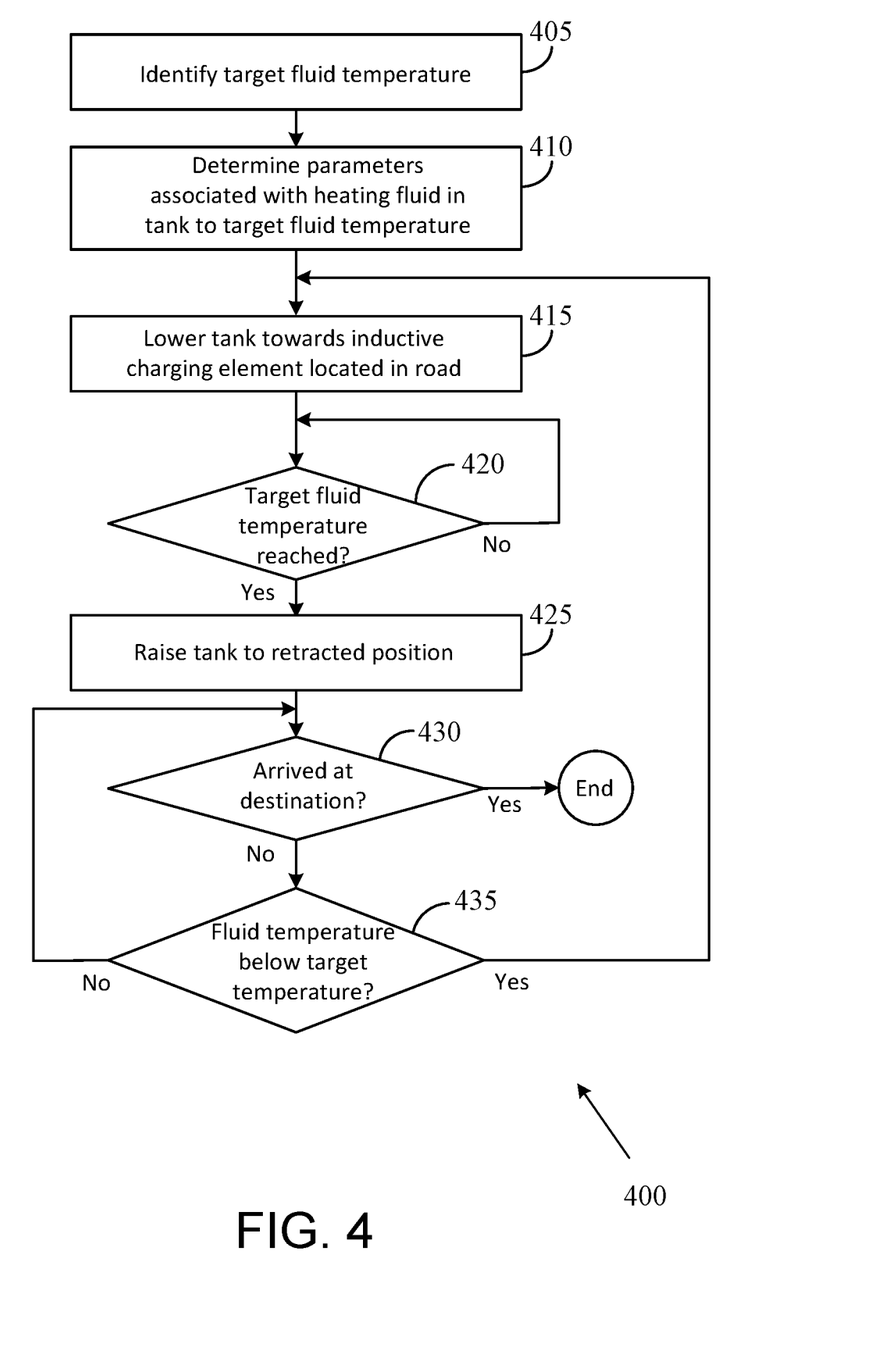
FIG. 4 shows an example flowchart of a method in accordance with the disclosure to heat a fluid transported in a vehicle.

FIG. 4 shows a flowchart 400 of an example method in accordance with the disclosure to heat a fluid transported in a vehicle such as, for example, to heat the fluid 141 contained in the tank 140 that is transported by the vehicle 115. The flowchart 400 illustrates a sequence of operations that can be implemented in hardware, software, or a combination thereof. In the context of software, the operations represent computer-executable instructions stored on one or more non-transitory computer-readable media, such as, for example, the memory 122 of the fluid tank heating system 120, that, when executed by one or more processors, such as the processor 121 of the fluid tank heating system 120, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. Various operations described in the flowchart 400 may be executed by the fluid tank heating system 120, the vehicle controller 110, a personal device, and/or manually by a driver of the vehicle 115.

At block 405, a target fluid temperature is identified by a fluid tank heating system. The target fluid temperature provides an indication as to an amount of heating to be carried out upon a fluid contained in a tank that is attached to a vehicle. In an example scenario, a driver of the vehicle can provide the target fluid temperature information based on the driver's knowledge of the nature of the fluid and/or an intended use of the fluid. For example, the driver may be a camper who desires to use water stored in the tank for domestic purposes such as, for example, to make tea upon arriving at a campsite. The driver may have a personal preference such as, for example, tea that is moderately hot or tea that is piping hot. Accordingly, the driver may provide an indication to the fluid tank heating system about the target fluid temperature via the GUI of an infotainment system or a personal device. The indication may be provided in numeric form in one case (135° F., for example) or in text form ("very hot," for example).

In another example scenario, the driver may select a target fluid temperature based on an amount of time that is available for heating the fluid. The amount of time can correspond, for example, to a driving distance to a destination and/or to a driving time to the destination.

In another example scenario, the fluid tank heating system may automatically identify the target fluid temperature based on an amount of time that may be needed and/or may be available to the fluid heating system to heat the fluid. In this scenario, the fluid tank heating system may use information obtained from a navigation system of the vehicle to identify a current location of the vehicle, an intended destination for a trip, and/or a duration of travel of the vehicle on the trip particularly, travel upon the road 150 that has the inductive heating system.

At block 410, the fluid tank heating system, may determine various parameters associated with heating the fluid to the target fluid temperature. One example parameter is a separation distance between the tank and an inductive heating element that is embedded in a road on which the vehicle is traveling or is expected to travel. Another example is an amount of time that the tank has to be retained in a lowered position for heating the fluid. The various parameters may be determined based on various factors that may be taken into consideration by the fluid tank heating system. Some example factors may include an ambient temperature outside the tank in which the fluid is being transported (hot weather, cold weather, freezing weather conditions, etc.) and a physical characteristic of the fluid (water, oil, etc.).

At block 415, the tank is lowered to a heating position above the inductive heating element in the road. The heating position may be based on the separation distance determined by the fluid tank heating system. In an example scenario, the tank can be lowered from a retracted position to any of multiple positions by activation of an elevator apparatus coupled to the tank. In another example scenario, the tank can be lowered from a retracted position to a preset lowered position by activation of an elevator apparatus coupled to the tank. In this example scenario, the tank can be in placed in either of two fixed positions—the retracted position or the lowered position (the heating position).

At block 420, a determination is made whether a target fluid temperature has been reached. The determination may be made by the fluid tank heating system based on temperature information provided by a temperature sensor that is configured to measure the temperature of the fluid in the tank. If the fluid has not yet reached the target fluid temperature, the fluid tank heating system retains the tank in the lowered position to continue heating the fluid.

If the fluid has reached the target fluid temperature, at block 425, the fluid tank heating system raises the tank to the retracted position. When the tank is placed in the retracted position, the separation distance between the inductive heating element and the tank exceeds a minimum separation distance that is needed to heat the fluid contained in the tank.

At block 430, a determination is made whether the vehicle has arrived at a destination for the trip. The fluid tank heating system may use information obtained from a navigation system of the vehicle to make the determination. If the vehicle has arrived at the destination, the fluid tank heating system discontinues further action.

If the vehicle has not yet reached the destination, at block 435, a determination is made whether the temperature of the fluid contained in the tank has dropped below the target temperature as a result of the tank being placed in the retracted position over a period of time. If the temperature of the fluid contained in the tank has not dropped below the target temperature, the fluid tank heating system refrains from carrying out additional operations upon the tank.

If the temperature of the fluid contained in the tank has dropped below the target temperature, the operations indicated by block 415 and subsequent blocks are carried out.

Figure 5:
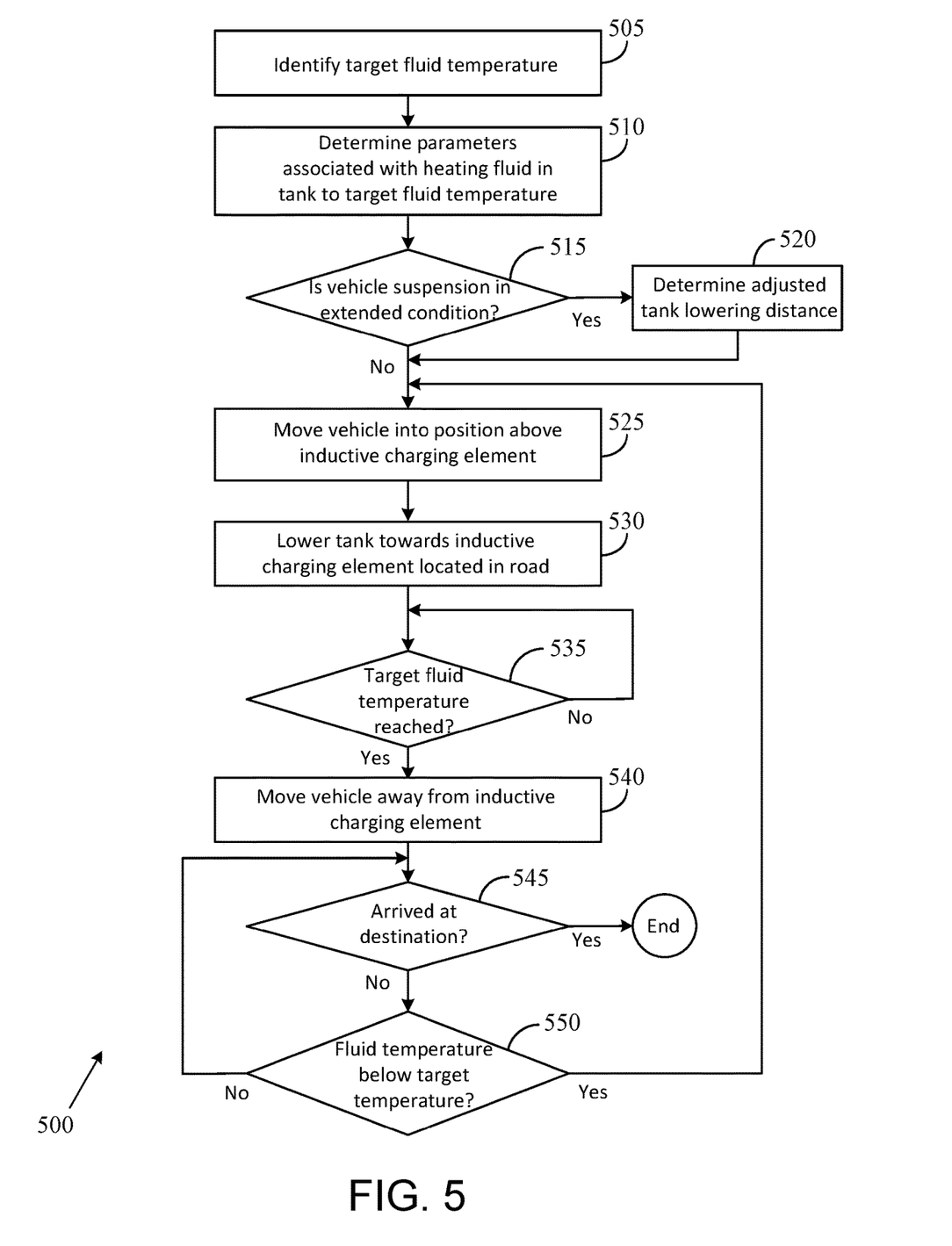
FIG. 5 shows an example flowchart of another method in accordance with the disclosure to heat a fluid transported in a vehicle.

FIG. 5 shows a flowchart 500 of another example method in accordance with the disclosure to heat a fluid transported in a vehicle such as, for example, to heat the fluid 141 contained in the tank 140 that is transported by the vehicle 115. The flowchart 500 illustrates a sequence of operations that can be implemented in hardware, software, or a combination thereof. In the context of software, the operations represent computer-executable instructions stored on one or more non-transitory computer-readable media, such as, for example, the memory 122 of the fluid tank heating system 120, that, when executed by one or more processors, such as the processor 121 of the fluid tank heating system 120, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel.

At block 505, a target fluid temperature is identified by a fluid tank heating system. The description provided above with respect to block 405 of the flowchart 400 is equally applicable to the block 505 of the flowchart 500 and will not be repeated here.

At block 510, the fluid tank heating system, may determine various parameters associated with heating the fluid to the target fluid temperature. The description provided above with respect to block 410 of the flowchart 400 is equally applicable to block 510 of the flowchart 500 and will not be repeated here.

At block 515, a determination is made whether a suspension system of the vehicle has been activated. When activated, a chassis of the vehicle is modified or changes, that is, it is raised to a second height that is greater than a second height of the vehicle when the vehicle is used for traveling over a smooth travel surface such as, for example, a paved road. Raising the chassis is generally carried out when the vehicle 115 is driven off-road so as to provide a greater amount of clearance between the underbody of the vehicle 115 and a ground surface. If the suspension system is activated, at block 520, the fluid tank heating system takes into consideration the increase in chassis height when determining a separation distance between a bottom surface of the tank that is attached to an underbody of the vehicle and an inductive heating element embedded in a road. At this time, the vehicle may be either parked at a spot that does not have an inductive heating element or may be traveling off-road on an unpaved surface.

At block 525, the fluid tank heating system may cooperate with a vehicle controller of the vehicle and/or a driver of the vehicle to move the vehicle into a position along a section of road where the vehicle is above the inductive heating element embedded in the road. This operation may involve a driver (or a computer of an autonomous vehicle) executing a driving maneuver to move the vehicle on to a section of road in which an inductive heating element is embedded or switching from a first lane in the road that does not include an embedded inductive heating element to a second lane having an embedded inductive heating element. The driving maneuver may further include aligning the tank to the embedded inductive heating element.

At block 530, the fluid tank heating system lowers the tank to a heating position above the inductive heating element in the road or lane. The description provided above with respect to block 415 of the flowchart 400 is equally applicable to the block 530 of the flowchart 500 and will not be repeated here. As an optional action, the suspension system may also be activated at this time to lower the chassis of the vehicle.

At block 535, a determination is made whether a target fluid temperature has been reached. The description provided above with respect to block 420 of the flowchart 400 is equally applicable to the block 535 of the flowchart 500 and will not be repeated here.

If the fluid has not yet reached the target fluid temperature, the fluid tank heating system retains the tank in the lowered position to continue heating the fluid.

If the fluid has reached the target fluid temperature, at block 540, the fluid tank heating system may cooperate with a vehicle controller of the vehicle and/or a driver of the vehicle to move the vehicle away from the inductive charging element embedded in the road. This operation may involve a driver (or a computer of an autonomous vehicle) moving the vehicle on to a section of road in which an inductive heating element is not present or moving the vehicle into a lane in the road that does not include an embedded inductive heating element.

At block 545, a determination is made whether the vehicle has arrived at a destination for the trip. The fluid tank heating system may use information obtained from a navigation system of the vehicle to make the determination. If the vehicle has arrived at the destination, the fluid tank heating system discontinues further action.

If the vehicle has not yet reached the destination, at block 550, a determination is made whether the temperature of the fluid contained in the tank has dropped below the target temperature as a result of the vehicle moving away from the inductive heating element. If the temperature of the fluid contained in the tank has not dropped below the target temperature, the fluid tank heating system refrains from carrying out additional operations upon the tank.

If the temperature of the fluid contained in the tank has dropped below the target temperature, the operations indicated by block 525 and subsequent blocks are carried out.

Figure 6:
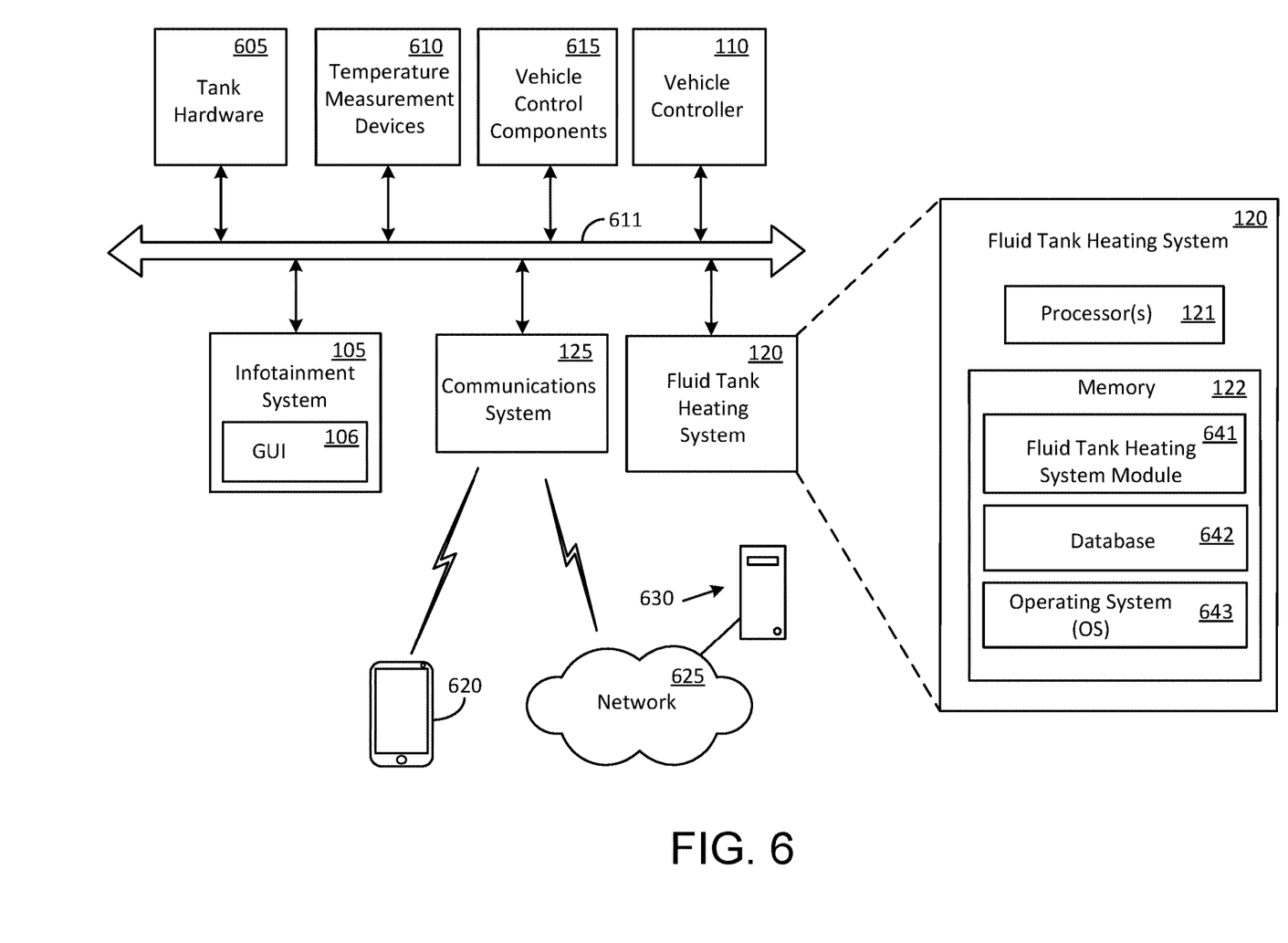
FIG. 6 illustrates some example components that may be included in a vehicle that is configured for heating a fluid in accordance with the disclosure.

FIG. 6 illustrates some example components that may be included in the example vehicle 115 that is configured for heating the fluid 141 contained in the tank 140. The example components can include tank hardware 605, temperature measurement devices 610, vehicle control components 615, the vehicle controller 110, the infotainment system 105, the communications system 125, and the fluid tank heating system 120.

The various components are communicatively coupled to each other via one or more buses such as an example bus 611. The bus 611 may be implemented using various wired and/or wireless technologies. For example, the bus 611 can be a vehicle bus that uses a controller area network (CAN) bus protocol, a Media Oriented Systems Transport (MOST) bus protocol, and/or a CAN flexible data (CAN-FD) bus protocol. Some or all portions of the bus 611 may also be implemented using wireless technologies such as Bluetooth®, Ultra-Wideband, Wi-Fi, Zigbee®, or near-field-communications (NFC).

The tank hardware 605 can include, for example, the elevator apparatus 145 for moving the tank 140 bi-directionally (e.g., up and down vertically), and may further include mounting hardware for attaching the tank 140 to the vehicle 115, the liftgate 205, or the trailer 305.

The temperature measurement devices 610 can include one or more temperature detecting devices such as, for example, the temperature sensor 130 and the temperature sensor 135.

The vehicle control components 615 can include various components associated with operating the vehicle 115, including the suspension system 116 described above.

The infotainment system 105 can include a GUI 106 that may be used by the driver of the vehicle 115 to provide and/or to obtain temperature related information to/from the fluid tank heating system 120.

The communication system 125 can include various components such as, for example, a wireless transmitter, a wireless receiver, and/or a wireless transceiver, that are configured to allow the fluid tank heating system 120 and the vehicle controller 110 to communicate with devices such as, for example, a personal device 620 carried by a driver of the vehicle 115 and a server computer 630 located outside the vehicle 115. The communications may be carried out via wireless signals either directly or via a network 625 by use of any of various communication formats such as, for example, WiFi, cellular, TCP/IP, Bluetooth®, Ultra-Wideband, Wi-Fi, Ultra-Wideband (UBW), Zigbee®, and near-field-communications (NFC). The network 625 may include any one, or a combination of networks, such as a local area network (LAN), a wide area network (WAN), a telephone network, a cellular network, a cable network, a wireless network, and/or private/public networks such as the Internet.

In one implementation, the fluid tank heating system 120 can be an independent device (enclosed in an enclosure, for example). In another implementation, some or all components of the fluid tank heating system 120 can be housed, merged, or can share functionality, with the vehicle controller 110. For example, an integrated unit that combines the functionality of the fluid tank heating system 120 with that of the vehicle controller 110 can be operated by a single processor and a single memory device. In the illustrated example configuration, the fluid tank heating system 120 includes the processor 121 and the memory 122.

The memory 122, which is one example of a non-transitory computer-readable medium, may be used to store an operating system (OS) 643, a database 642, and various code modules such as a fluid tank heating system module 641. The code modules are provided in the form of computer-executable instructions that can be executed by the processor 121 for performing various operations in accordance with the disclosure. Some example operations are described above with reference to the flowchart 400 and the flowchart 500.

The database 642 may be used to store information such as, for example, dimension information about the tank 140, mounting information about the tank 140, and/or separation distance information between the tank 140 and a road surface.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device, such as a memory provided in the personal device 206 can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
    identifying, by a processor in a vehicle, a target fluid temperature;
    determining, by the processor, based on the target fluid temperature, a separation distance between a tank that is attached to an underbody of the vehicle and an inductive heating element embedded in a road;
    lowering, by the processor, the tank to a heating position above the inductive heating element based on the separation distance; and
    retaining, by the processor, the tank in the heating position for using the inductive heating element to heat a fluid contained in the tank.

2. The method of claim 1, further comprising:
    raising, by the processor, the tank to a retracted position upon determining that the fluid has been heated to the target fluid temperature.

3. The method of claim 2, further comprising:
    detecting, by the processor, a drop in temperature of the fluid below the target fluid temperature when the tank is in the retracted position; and
    re-lowering the tank to the heating position for re-heating the fluid to the target fluid temperature.

4. The method of claim 1, wherein identifying the target fluid temperature comprises at least one of measuring an ambient temperature outside the vehicle, obtaining an instruction from an occupant of the vehicle, obtaining information about the fluid contained in the tank, obtaining information about a travel distance of the vehicle on the road having the inductive heating element, or obtaining information about a travel time of the vehicle on the road having the inductive heating element.

5. The method of claim 1, further comprising:
    executing, by one of the processor or a driver of the vehicle, a first driving maneuver to align the tank with the inductive heating element while the vehicle is moving on the road.

6. The method of claim 5, further comprising:
    executing, by the one of the processor or the driver of the vehicle, a second driving maneuver to move the vehicle away from the inductive heating element for discontinuing heating of the fluid.

7. The method of claim 6 wherein executing the first driving maneuver comprises moving the vehicle along a section of the road in which the inductive heating element is provided and wherein executing the second driving maneuver comprises moving the vehicle away from the section of the road in which the inductive heating element is provided.

8. A method comprising:
    executing a first driving maneuver upon a vehicle to align a tank that is attached to an underbody of the vehicle with an inductive heating element embedded in a road on which the vehicle is moving;
    lowering the tank to a heating position above the inductive heating element; and
    retaining the tank in the heating position for using the inductive heating element to heat a fluid contained in the tank.

9. The method of claim 8, further comprising:
    identifying a target fluid temperature;
    determining, based on the target fluid temperature, a separation distance between the tank and the inductive heating element; and
    lowering the tank to the heating position based on the separation distance.

10. The method of claim 9, further comprising:
    change a height of a suspension of the vehicle based on the separation distance.

11. The method of claim 9, wherein identifying the target fluid temperature comprises at least one of measuring an ambient temperature outside the vehicle, obtaining an instruction from an occupant of the vehicle, obtaining information about the fluid contained in the tank, obtaining information about a travel distance of the vehicle on the road having the inductive heating element, or obtaining information about a travel time of the vehicle on the road having the inductive heating element.

12. The method of claim 9, further comprising:
    raising the tank to a retracted position upon determining that the fluid has been heated to the target fluid temperature.

13. The method of claim 12, further comprising:
detecting a drop in temperature of the fluid below the target fluid temperature when the tank is in the retracted position; and
re-lowering the tank to the heating position for re-heating the fluid to the target fluid temperature.

14. A vehicle comprising:
a tank that is attached to the vehicle; and
a tank heating system comprising:
    a memory that stores computer-executable instructions; and
    a processor configured to access the memory and execute the computer-executable instructions to perform operations comprising:
        lowering the tank to a heating position above an inductive heating element embedded in a road; and
        retaining the tank in the heating position for using the inductive heating element to heat a fluid contained in the tank.

15. The vehicle of claim 14, wherein the tank comprises a ferrous material, wherein the tank is one of attached to an underbody of the vehicle, mounted upon a trailer coupled to the vehicle, or mounted upon a fixture coupled to the vehicle.

16. The vehicle of claim 14, further comprising a temperature sensor, and wherein the processor is further configured to access the memory and execute the computer-executable instructions to perform operations comprising:
detecting, based on a first signal received from the temperature sensor, that the fluid has been heated to a target fluid temperature; and
raising the tank to a retracted position upon detecting that the fluid has been heated to the target fluid temperature.

17. The vehicle of claim 16, wherein the processor is further configured to access the memory and execute the computer-executable instructions to perform operations comprising:
detecting, based on a second signal received from the temperature sensor, a drop in temperature of the fluid below the target fluid temperature when the tank is in the retracted position; and
re-lowering the tank to the heating position for re-heating the fluid to the target fluid temperature.

18. The vehicle of claim 14, further comprising a temperature sensor, wherein the processor is further configured to access the memory and execute the computer-executable instructions to perform operations comprising:
detecting, based on a first signal received from the temperature sensor, an ambient temperature outside the vehicle; and
determining a period of time over which to retain the tank in the heating position based on the ambient temperature outside the vehicle.

19. The vehicle of claim 14, wherein the tank is attached to an underbody of the vehicle and wherein the processor is further configured to access the memory and execute the computer-executable instructions to perform operations comprising:
changing a height of a suspension of the vehicle;
identifying a target fluid temperature;
determining based on the target fluid temperature, a separation distance between the tank and the inductive heating element embedded in the road; and
lowering the tank to the heating position based on the separation distance and the height of the suspension.

20. The vehicle of claim 14, wherein the tank is attached to an underbody of the vehicle and wherein the tank heating system includes an elevator apparatus for moving the tank in a vertical direction with respect to the underbody of the vehicle.

* * * * *